US009284872B2

(12) United States Patent
Gong et al.

(10) Patent No.: US 9,284,872 B2
(45) Date of Patent: Mar. 15, 2016

(54) SYSTEM, METHODS, AND APPARATUS FOR LOW TEMPERATURE DOSING IN DIESEL EXHAUST SYSTEMS

(71) Applicant: Cummins Emission Solutions Inc., Columbus, IN (US)

(72) Inventors: Jinqian Gong, Columbus, IN (US); Josh S. Shao, Columbus, IN (US); Quazi Syed Fawad, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 106 days.

(21) Appl. No.: 14/028,893

(22) Filed: Sep. 17, 2013

(65) Prior Publication Data
US 2015/0075143 A1    Mar. 19, 2015

(51) Int. Cl.
*F01N 3/10* (2006.01)
*F01N 3/20* (2006.01)
*B01D 53/94* (2006.01)
*B01D 53/90* (2006.01)
*F01N 9/00* (2006.01)
*F01N 11/00* (2006.01)

(52) U.S. Cl.
CPC ............... *F01N 3/208* (2013.01); *B01D 53/90* (2013.01); *B01D 53/9431* (2013.01); *B01D 53/9495* (2013.01); *F01N 9/00* (2013.01); *F01N 11/002* (2013.01); *F01N 2560/026* (2013.01); *F01N 2560/06* (2013.01); *F01N 2610/02* (2013.01); *F01N 2610/146* (2013.01); *F01N 2900/1602* (2013.01); *F01N 2900/1621* (2013.01); *F01N 2900/1812* (2013.01)

(58) Field of Classification Search
CPC ....... F01N 3/0842; F01N 3/208; F01N 9/005; F01N 11/002; F01N 11/007; F01N 2560/026; F01N 2560/06; F01N 2560/14; F01N 9/00; B01D 53/9431; B01D 53/9495; B01D 53/90
USPC .................................................. 60/272–324
See application file for complete search history.

(56) References Cited

U.S. PATENT DOCUMENTS

| 4,963,332 | A |   | 10/1990 | Brand et al. |
| 5,522,218 | A | * | 6/1996  | Lane et al. ...................... 60/274 |
| 6,125,629 | A |   | 10/2000 | Patchett |
| 6,470,676 | B2 |  | 10/2002 | Dolling et al. |
| 6,662,553 | B2 |  | 12/2003 | Patchett et al. |
| 6,698,191 | B2 |  | 3/2004  | Xu et al. |
| 6,742,330 | B2 |  | 6/2004  | Genderen |

(Continued)

FOREIGN PATENT DOCUMENTS

EP    1 458 960 B1    2/2011

OTHER PUBLICATIONS

International Search Report and Written Opinion of the International Search Authority for application No. PCT/US2014/053178, issued on Dec. 17, 2014.

*Primary Examiner* — Jesse Bogue
*Assistant Examiner* — Kelsey Stanek
(74) *Attorney, Agent, or Firm* — Foley & Lardner LLP

(57) ABSTRACT

System, apparatus, and methods are disclosed for reductant dosing in an exhaust aftertreatment system. A dynamic flow rate and injection duration of a reductant injected from a reductant dosing system to the exhaust aftertreatment system is controlled in response to a dosing command when the exhaust system is operating in a low temperature operating condition.

21 Claims, 3 Drawing Sheets

(56) References Cited

U.S. PATENT DOCUMENTS

| | | |
|---|---|---|
| 8,307,636 B2 * | 11/2012 | Matsunaga ................. 60/286 |
| 2004/0098974 A1 * | 5/2004 | Nieuwstadt et al. ............ 60/286 |
| 2009/0223207 A1 | 9/2009 | Ren |
| 2010/0012205 A1 * | 1/2010 | Vandervoort et al. ......... 137/588 |
| 2010/0186383 A1 * | 7/2010 | Kesse et al. ..................... 60/286 |
| 2011/0113753 A1 * | 5/2011 | Christner et al. ............... 60/274 |
| 2012/0233986 A1 | 9/2012 | Geveci et al. |
| 2012/0275978 A1 | 11/2012 | Girard et al. |
| 2013/0199157 A1 | 8/2013 | Henry et al. |

* cited by examiner

SYSTEM, METHODS, AND APPARATUS FOR LOW TEMPERATURE DOSING IN DIESEL EXHAUST SYSTEMS

BACKGROUND

The present application generally relates to internal combustion engine diesel exhaust systems, and more particularly, but not exclusively, to low temperature dosing of reductant in diesel exhaust systems.

Modern systems that include internal combustion engines often include a selective catalytic reduction (SCR) exhaust aftertreatment system to control exhaust system emissions. SCR systems typically include a reductant storage tank connected to a doser that injects reductant into the exhaust stream to reduce NOx emissions. Under normal operating conditions, reductant is injected into the exhaust stream at a continuous rate.

Under low temperature operating conditions, injecting reductant at a continuous rate causes reductant buildup and reductant slip. Further, not injecting reductant at low operating conditions causes NOx emissions to exceed required limitations on NOx emissions. Therefore, a need remains for further improvements in systems, apparatus, and methods for performing dosing of a reductant in exhaust aftertreatment systems at low temperature operating conditions.

SUMMARY

One embodiment is a unique system, method, and apparatus to modulate the flow rate of a reductant in an exhaust aftertreatment system during a low temperature operating condition of an engine exhaust system. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
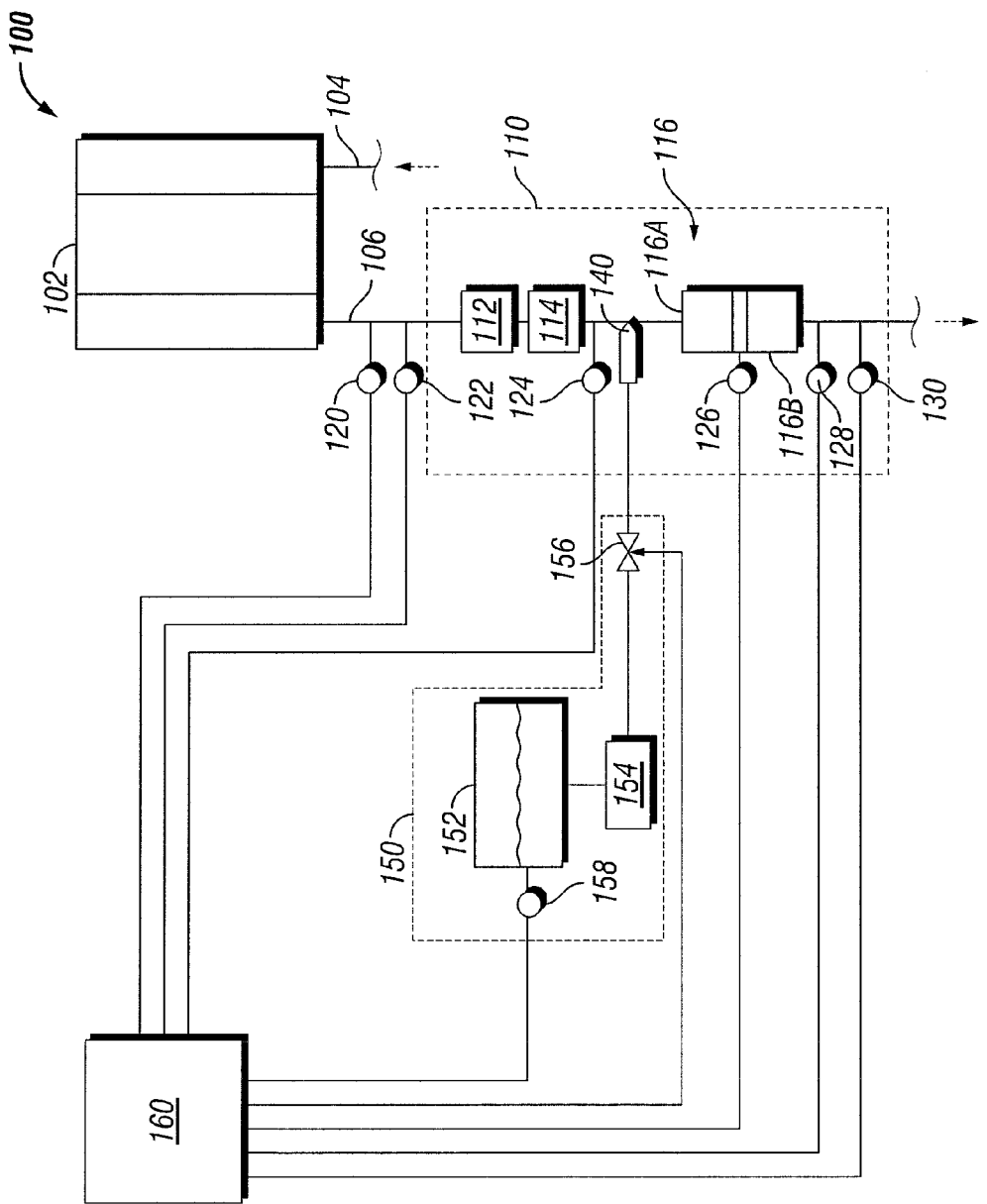
FIG. 1 is a schematic illustration of a system including an exemplary engine and exhaust aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated an exemplary system 100 that includes an exhaust aftertreatment system 110. System 100 may be provided on a vehicle powered by an engine 102 such as a diesel engine, or on an engine 102 utilized in other applications such as power generation or pumping systems. Engine 102 includes an intake system 104 through which charge air enters and an exhaust system 106 through which exhaust gas resulting from combustion exits, it being understood that not all details of these systems that are typically present are shown. Engine 102 includes a number of cylinders forming combustion chambers into which fuel is injected by fuel injectors to combust with the charge air that has entered through intake system 104. The energy released by combustion powers the engine 102 via pistons connected to a crankshaft. When used to propel a vehicle, engine 102 is coupled through a drivetrain to drive wheels that propel the vehicle. Intake valves control the admission of charge air into the cylinders, and exhaust valves control the outflow of exhaust gas through exhaust system 106 and ultimately to the atmosphere. Before entering the atmosphere, however, the exhaust gas is treated by one or more aftertreatment devices in the exhaust aftertreatment system 110.

In one example, the exhaust system 106 includes the exhaust aftertreatment system 110 having one or more selective catalytic reduction (SCR) catalysts 116, and one or more locations for receiving a reductant from a reductant dosing system 150. The exhaust aftertreatment system 110 also includes one or more diesel oxidation catalysts (DOC) 112, and one or more diesel particulate filters (DPF) 114 upstream of SCR catalyst 116. A reductant injector 140 is mounted on a portion of exhaust system 106 upstream of SCR catalyst 116 with its outlet, or nozzle, arranged to spray reductant into the exhaust system 106 where it mixes with engine exhaust gas produced by engine 102. SCR catalyst 116 promotes a chemical reaction between the reductant and NOx in the exhaust gas that converts substantial amounts of NOx to reduce NOx emissions before the exhaust gas passes into the atmosphere.

The aftertreatment system 110 may include one or more other aftertreatment components not shown, such as an ammonia oxidation catalyst, and various temperature, pressure and exhaust gas constituent sensors. Exhaust system 106 may also include various components not shown, such an exhaust gas recirculation system, a turbocharger system, coolers, and other components connecting exhaust system 106 to intake system 104.

Reductant dosing system 150 receives reductant from a reductant storage tank 152 and provides the reductant to the exhaust system 106 via an injector 140 or other structure for injection or delivery to a decomposition chamber or directly to the exhaust system 106. The flow of reductant through injector 140 can be controlled by a dosing system two-way control valve 156, which can include any suitable device for toggling, stopping, allowing and/or limiting reductant flow from the reductant storage tank 152 through the reductant doser 154 to the injector 140. As used herein, injector includes any nozzle, static device, electronically controllable device, and/or mechanical actuator that provides an outlet for reductant delivery. One example of a suitable reductant is a diesel exhaust fluid (DEF) which comprises a solution of 32.5% high purity urea and 67.5% deionized water. It shall be appreciated, however, that any suitable reductant for injection into an exhaust system with dosing system 150 may also be utilized.

In certain embodiments, the system 100 further includes a controller 160 structured to perform certain operations to receive and interpret signals from any component or sensor of the system 100. It shall be appreciated that the controller or control module may be provided in a variety of forms and configurations including one or more computing devices forming a whole or part of a processing subsystem having non-transitory memory storing computer executable instructions, processing, and communication hardware.

In FIG. 1, controller 160 is operatively coupled with and configured to store instructions in memory which are readable and executable by controller 160 to operate the dosing system control valve. Controller 160 is further operatively coupled with and may receive a signal from an exhaust flow rate sensor 120, an engine out NOx amount sensor 122, a DPF outlet temperature sensor 124, an SCR mid-bed temperature sensor 126, an SCR catalyst outlet temperature sensor 128, and an SCR catalyst outlet NOx amount sensor 130. Exhaust flow rate sensor 120 is operable to provide a signal indicating the flow rate of diesel exhaust, or mass flow rate, in the exhaust system 106. Engine out NOx amount sensor 122 is operable to provide a signal indicating the amount of diesel exhaust in the exhaust system 106. DPF outlet temperature sensor 124 is operable to provide a signal indicating the temperature downstream of the DPF 114. SCR catalyst mid-bed temperature sensor 126 is operable to provide a signal indicating the reductant temperature in a mid-bed of an SCR catalyst 116 between an upstream SCR catalyst bed 116a and a downstream SCR catalyst bed 116b. SCR catalyst outlet temperature sensor 128 is operable to provide a signal indicating the temperature downstream of the SCR catalyst 116. SCR catalyst outlet NOx amount sensor 130 is operable to provide a signal indicating a NOx level downstream of the SCR catalyst 116. Exhaust flow rate sensor 120, engine out NOx amount sensor 122, DPF outlet temperature sensor 124, SCR catalyst mid-bed temperature sensor 126, SCR catalyst outlet temperature sensor 128, and SCR catalyst outlet NOx amount sensor 130 need not be in direct communication with exhaust system 106, and can be located at any position within exhaust system 106 that provides a suitable indication of applicable exhaust system 106 readings.

In FIG. 1, controller 160 is further connected to reductant dosing system 150 and dosing system two-way control valve 156. Controller 160 is further operatively coupled with and may receive a signal from a reductant storage tank level sensor 158. Reductant storage tank level sensor 158 is operable to provide a signal indicating the level of the reductant in the reductant storage tank 152. Reductant level sensor 158 need not be in direct communication with reductant storage tank 152, and can be located at any position within reductant dosing system 150 that provides a suitable indication of applicable reductant level readings in reductant storage tank 152.

The controller 160 includes stored data values, constants, and functions, as well as operating instructions stored on computer readable medium. Any of the operations of exemplary procedures described herein may be performed at least partially by the controller. The description herein including modules emphasizes the structural independence of the aspects of the controller 160, and illustrates one grouping of operations and responsibilities of the controller 160. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2. Operations illustrated are understood to be exemplary only, and operations may be combined or divided, and added or removed, as well as re-ordered in whole or part, unless stated explicitly to the contrary herein.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
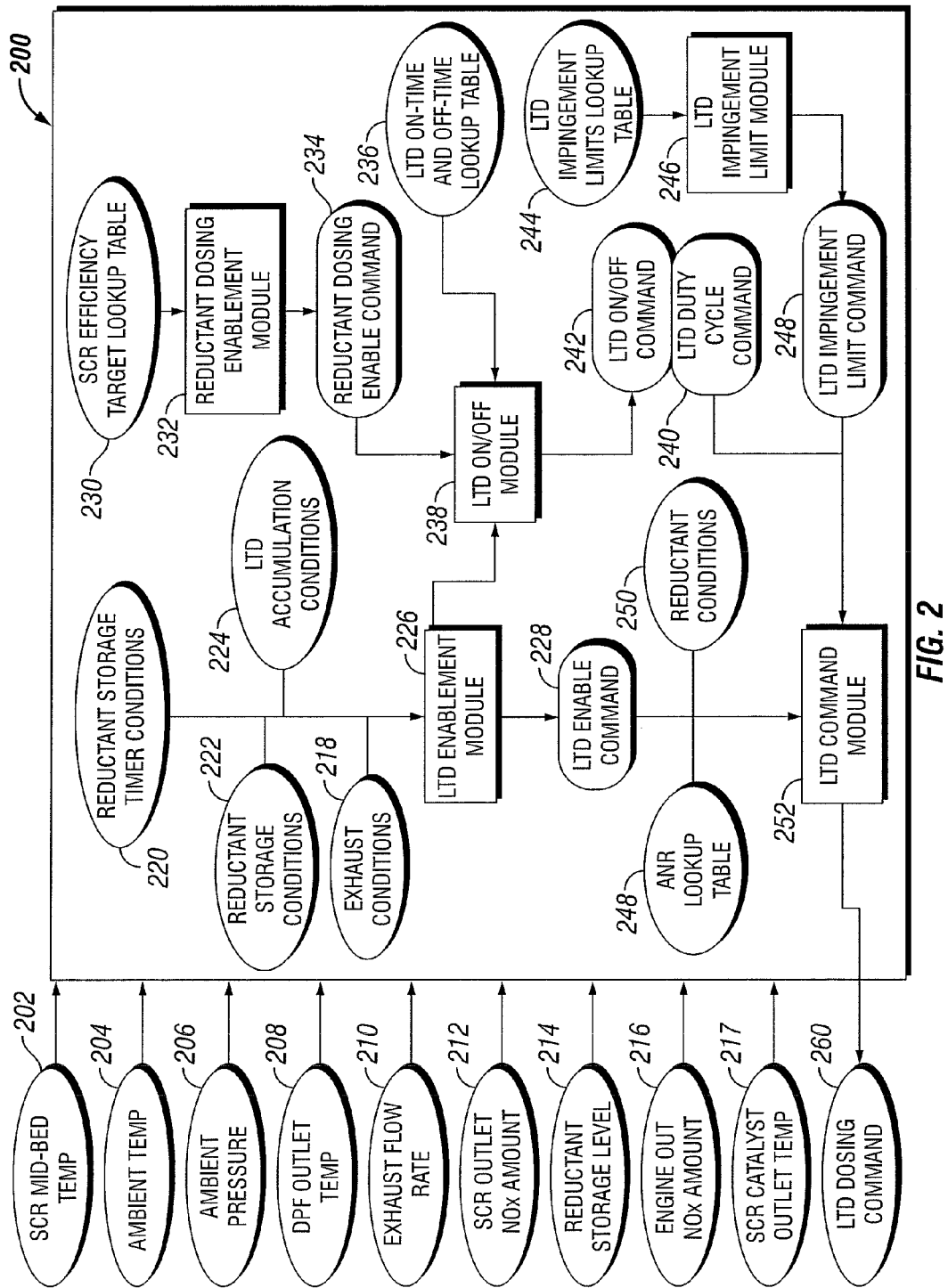
FIG. 2 is a diagram illustrating an exemplary controller apparatus for controlling reductant dosing in a low temperature operating range.

One exemplary embodiment of controller 160 is shown in FIG. 2. In certain embodiments, the controller 160 includes an exhaust flow rate input 210 from the exhaust flow rate sensor 120, an engine out NOx amount input 216 from the exhaust NOx amount sensor 122, a DPF outlet temperature input 208 from the DPF outlet temperature sensor 124, an SCR catalyst mid-bed temperature input 202 from the SCR catalyst mid-bed temperature sensor 126, an SCR catalyst outlet temperature input 217 from the SCR catalyst outlet temperature sensor 128, an SCR catalyst outlet NOx amount input 212 from the SCR catalyst outlet NOx amount sensor 130, and a reductant storage tank level input 214 from the reductant storage tank sensor 158.

During operation, reductant dosing system 150 supplies reductant in response to a dosing command that is interpreted by controller 160. The controller 160 interprets operating conditions of engine 102 and exhaust system 106 to determine a low temperature operating condition. Upon the determining of a low temperature operating condition, the controller 160 determines a quantity of reductant and a length of time over which to inject the determined quantity of reductant into exhaust system 106 at an injection rate according to programmed operating instructions.

The controller 160 illustrated in FIG. 2 includes a low temperature dosing enablement module 226, a reductant dosing enablement module 232, a low temperature dosing on/off module 238, a low temperature dosing impingement limit module 246, and a low temperature dosing command module 252. Other controller 160 arrangements that functionally execute the operations of the controller 160 are contemplated in the present application.

The low temperature dosing enablement module 226 receives and interprets ambient temperature input 204 and ambient pressure input 206. In an exemplary embodiment, the low temperature dosing enablement module 226 further interprets exhaust conditions 218, reductant storage timer conditions 220, reductant storage conditions 222, and low temperature dosing accumulation conditions 224. The low temperature dosing module 226 determines whether the exhaust system 106 is in a low temperature dosing cycle in response to a function of ambient temperature input 204, ambient pressure input 206, exhaust conditions 218, reductant storage timer conditions 220, reductant storage conditions 222, and low temperature dosing accumulation conditions 224. In an exemplary embodiment, the low temperature dosing enablement module provides a low temperature dosing enable command 228 to each of the low temperature dosing on/off module 238 and the low temperature dosing command module 252.

The low temperature dosing enablement module 226 determines whether exhaust conditions 218 enable the low temperature dosing cycle in response to determining the SCR catalyst mid-bed temperature input 202 temperature is within a low temperature dosing range and the DPF outlet temperature input 208 temperature is above a predetermined threshold DPF outlet temperature. The exemplary low temperature dosing range in an embodiment is between 150° C. and 190° C.

The low temperature dosing enablement module 226 determines whether reductant storage timer conditions 220 enable the low temperature dosing cycle in response to determining a reductant storage timer adjustment condition and/or a reductant storage timer reset condition. An exemplary reductant storage timer adjustment condition is a function of exhaust flow rate input 210, a threshold exhaust flow rate, a reductant injection feedback, a threshold reduction injection feedback. An exemplary reductant storage timer reset condition is a function of the SCR catalyst mid-bed temperature input 202, a threshold SCR catalyst mid-bed temperature, and the SCR catalyst state of regeneration. A reductant storage timer (not shown) shifts or resets a reductant storage timer count in response to the reductant storage timer conditions. The exemplary behavior of the reductant storage timer conditions 220 is further detailed in FIG. 3.

The low temperature dosing enablement module 226 determines whether low temperature dosing accumulation conditions 224 enable the low temperature dosing cycle in response to determining a low temperature dosing accumulation adjustment condition and/or a low temperature dosing accumulation reset condition. An exemplary low temperature dosing accumulation adjustment condition is a function of the SCR catalyst mid-bed temperature input 202, a threshold SCR catalyst mid-bed temperature, a low temperature dosing accumulation decrement rate, and a reductant injection rate feedback parameter. The low temperature dosing accumulation decrement rate is accessed in a low temperature dosing accumulation decrement rate lookup table (not shown) in response to the SCR catalyst mid-bed temperature input 202. An exemplary low temperature dosing accumulation reset condition is a function of the SCR catalyst mid-bed temperature input 202 and a threshold SCR catalyst mid-bed temperature.

The reductant dosing enablement module 232 receives and interprets exhaust flow rate input 210, SCR catalyst efficiency, and SCR catalyst mid-bed temperature input 202. Further, the reductant dosing enablement module 232 determines an SCR catalyst efficiency target accessed in a low temperature dosing SCR catalyst efficiency target lookup table 230 in response to the SCR catalyst mid-bed temperature input 202 and an SCR catalyst efficiency. The reductant dosing enablement module 232 provides a reductant dosing enable command 234 to the low temperature dosing on/off module 238 in response to a function of the SCR catalyst efficiency, the SCR catalyst efficiency target, and the exhaust flow rate input 210.

The low temperature dosing on/off module 238 receives and interprets the SCR catalyst mid-bed temperature input 202, the low temperature dosing enable command 228, and the reductant dosing enable command 234. The low temperature dosing on/off module determines a low temperature dosing duty cycle and provides a low temperature dosing duty cycle command 240 to the low temperature dosing command module 252 in response to a low temperature dosing duty cycle target determined from a low temperature dosing on-time and off-time target lookup table. Generally, the dosing on-time decreases and the dosing off-time increases as the SCR catalyst mid-bed temperature input 202 decreases in the low temperature range, and the dosing on-time increases and the dosing off-time decreases as the SCR catalyst mid-bed temperature input 202 increases in the low temperature range. The on-time and off-time are determined so that the injected amount of reductant is vaporized by the exhaust gas at the SCR catalyst mid-bed temperature input 202. Further, the low temperature dosing on/off module 238 determines a low temperature dosing on/off command 242 in response to the SCR catalyst mid-bed temperature input 202, the low temperature dosing enable command 228, the reductant dosing enable command 234, and the duration the dosing control has been in the low temperature dosing on or off state.

The low temperature dosing impingement limit module 246 receives and interprets exhaust flow rate input 210, DPF outlet temperature input 208, and ambient temperature input 204. Further, the low temperature dosing impingement limit module 246 accesses a low temperature dosing impingement limit lookup table 244 and provides a low temperature dosing impingement limit command 248 to the low temperature dosing command module 252 in response to the exhaust flow rate input 210, DPF outlet temperature input 208, and ambient temperature input 204.

In an exemplary embodiment, the low temperature dosing command module 252 receives and interprets the low temperature dosing enable command 228, the duty cycle command 240, the dosing on/off command 242, the low temperature dosing impingement limit command 246, and reductant conditions 250. Further, the low temperature dosing command module 252 determined an ammonia to NOx ratio (ANR) target from, for example, an ANR lookup table 248 in response to the SCR catalyst mid-bed temperature input 202. When the low temperature dosing enable command 228 is a low temperature dosing cycle enabled command, the controller 160 provides a low temperature dosing command(s) 260 in response to the ammonia to NOx ratio (ANR) target, the low temperature dosing duty cycle command 240, the exhaust flow rate input 210, and the engine out NOx amount 210. The low temperature dosing command(s) 260 is limited by low temperature dosing impingement limit command 246, and delivered through a series of injections according to low temperature dosing on/off command 242. In certain embodiments, one or more low temperature dosing command(s) 260 are provided to the dosing system two-way control valve 156 to perform a low temperature dosing operation on or off cycle.

Figure 3:
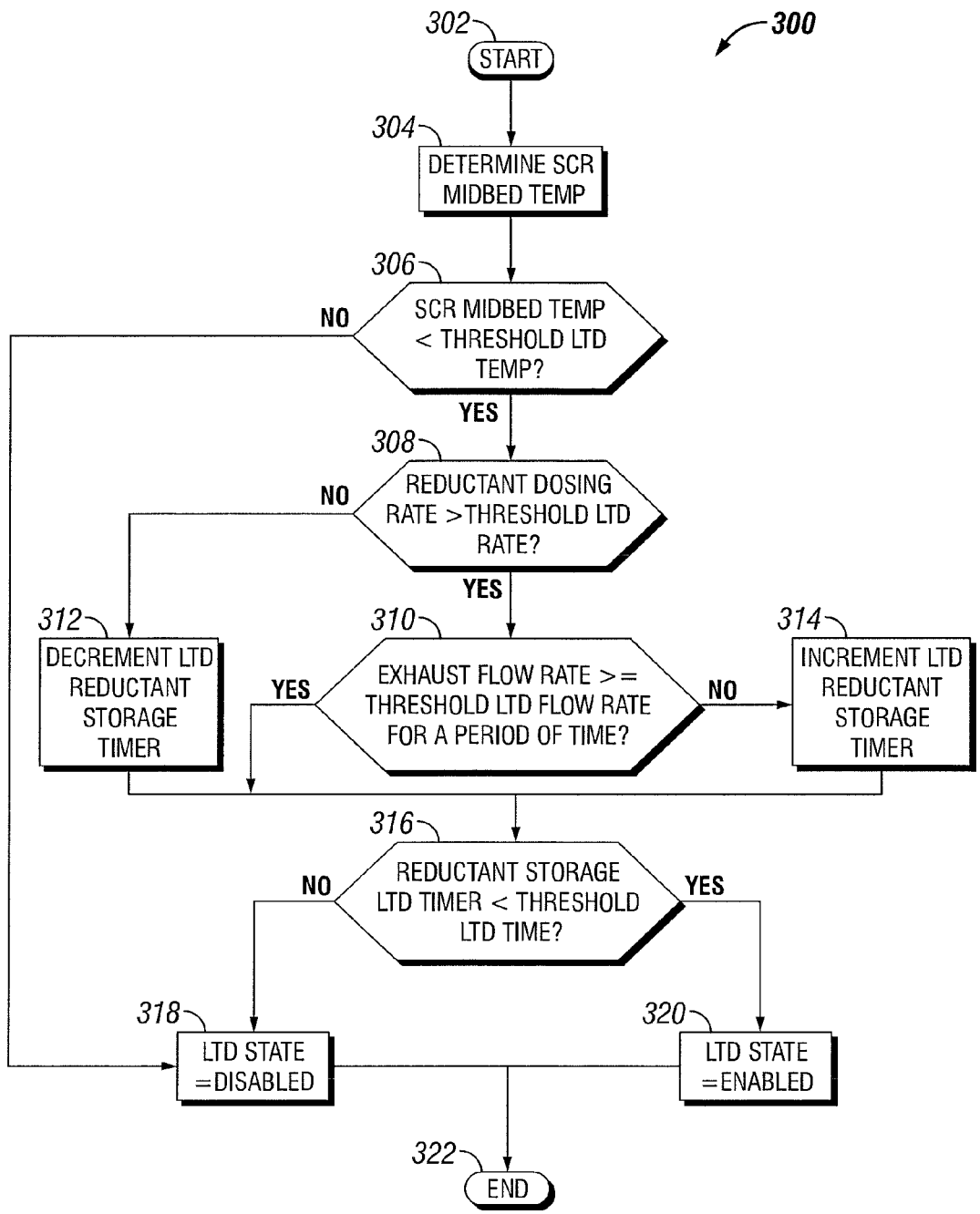
FIG. 3 is a flow diagram of a procedure that can be performed in conjunction with reductant dosing in a low temperature operating range.

The schematic flow diagram in FIG. 3 and related description which follows provides an illustrative embodiment of performing procedures for enabling a low temperature dosing cycle and adjusting a reductant storage timer. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

With reference to FIG. 3, there is illustrated a flow diagram of an exemplary procedure 300 for enabling a low temperature dosing cycle that is put into operation by programming into controller 160 for use in, for example, system 100. Procedure 300 begins at operation 302 in which a control routine for enabling a low temperature dosing cycle is started. Operation 302 can begin by interpreting a key-on event and/or by initiation by an operator or technician. Operation 302 may alternatively or additionally include interpreting a communication or other parameter indicating that operation of the low temperature dosing cycle determination is going to restart procedure 300 upon completion of procedure 300. Procedure 300 proceeds at operation 304, where the SCR catalyst mid-bed temperature is interpreted.

From operation 304, procedure 300 proceeds at conditional 306 where it is determined whether the SCR catalyst mid-bed temperature is less than a threshold low temperature dosing temperature. In certain embodiments, a threshold low temperature dosing temperature is between 150° C. and 190° C. If conditional 306 is negative, procedure 300 proceeds at operation 318 to set the low temperature dosing cycle to disabled.

If conditional 306 is positive, procedure 300 proceeds at conditional 308 where it is determined whether a current reductant dosing rate is greater than a threshold low temperature dosing rate. If conditional 308 is negative, procedure 300 proceeds to operation 312 to decrement the low temperature dosing threshold reductant storage timer. From operation 312, procedure 300 then continues to conditional 316 where it is determined whether the low temperature dosing reductant storage timer is less than the threshold low temperature dosing time. If conditional 316 is negative, procedure 300 proceeds to operation 318 to, as discussed above, set the low temperature dosing cycle to disabled and resets the reductant storage low temperature threshold timer to 0 (zero). If conditional 316 is positive, procedure 300 proceeds to operation 320 to set the low temperature dosing cycle to enabled. From operations 318 and 320, procedure 300 is terminated at 322.

If conditional 308 is positive, procedure 300 proceeds to conditional 310 to determine whether a current exhaust flow rate is above or equal to a threshold low temperature dosing flow rate for a period of time. If conditional 310 is positive for a period of time, procedure 300 proceeds to operation 316 to, as noted above, decrement the low temperature dosing reductant storage timer less than the threshold low temperature dosing time. If conditional 310 is negative, the procedure 300 proceeds to operation 314 to increment the low temperature dosing reductant storage timer. From operation 314, procedure 300 proceeds to conditional 316, where, as noted above, it is determined whether the low temperature dosing reductant storage timer is less than the threshold low temperature dosing time.

Various aspects of the systems, apparatus, and methods disclosed herein. For example, one aspect involves a method that includes determining that a mid-bed temperature of a bed of a selective catalytic reduction (SCR) catalyst in an exhaust aftertreatment system is in a low temperature operating range and while in the low temperature operating range, initiating a low temperature dosing cycle to supply a quantity of a reductant to the exhaust aftertreatment system through a series of pulsed injections of reductant. A length of the pulses is modulated dynamically in the dosing cycle as a function of the mid-bed temperature of the bed of the SCR catalyst.

In one embodiment of the method, a low temperature operating range of the SCR catalyst mid-bed includes determining the temperature of the SCR catalyst mid-bed is between 150° C. and 190° C. In one refinement, the method includes terminating the low temperature dosing cycle in response to determining an exhaust flow rate is below a predetermined exhaust flow rate threshold. In a further refinement, the method includes terminating the low temperature dosing cycle in response to determining an efficiency of the SCR catalyst is above a predetermined SCR catalyst efficiency threshold. In a further refinement of the method, the reductant is an aqueous urea solution.

In another embodiment of the method, the predetermined SCR catalyst efficiency threshold varies dynamically in the low temperature dosing cycle based on the SCR catalyst mid-bed temperature. In a refinement of the method, the exhaust aftertreatment system further comprises a diesel particulate filter (DPF). The quantity of the reductant is limited by an impingement limit of the SCR catalyst. The impingement limit is determined as a function of an outlet temperature of the DPF, an exhaust flow rate, and an ambient temperature.

In a further refinement, the method includes determining a set of enable conditions are satisfied before initiating the low temperature dosing cycle. The set of enable conditions include an outlet temperature of a diesel particulate filter (DPF) of the exhaust aftertreatment system being above a DPF temperature threshold; an ambient temperature being above an ambient temperature threshold; an ambient pressure being above an ambient pressure threshold; a urea deposit timer being below a urea deposit timer threshold; an accumulated low temperature dosing amount is below an accumulated reductant threshold; and an ammonia storage timer is below an ammonia storage timer threshold.

In another aspect, a method includes dosing a reductant into an engine exhaust gas upstream of a selective catalytic reduction (SCR) catalyst while the SCR catalyst is in a low temperature range of operation. Dosing the reductant includes injecting a predetermined quantity of the reductant over a duty cycle through a series of pulses each having an on-time with an off-time between successive pulses. The on-time and the off-time is a function of a mid-bed temperature of the SCR catalyst during the low temperature range of operation.

In a refinement of the method, the predetermined quantity of reductant is selected to satisfy an ammonia to nitrous oxide ratio at an outlet of the SCR catalyst. The ammonia to nitrous oxide ratio is a function of a mid-bed temperature of the SCR catalyst. In a further refinement of the method, the low temperature range of operation corresponds to a mid-bed temperature of the SCR catalyst that is between 150° C. and 190° C.

In one refinement, the method includes terminating the duty cycle when an efficiency of the SCR catalyst exceeds a dynamic SCR catalyst efficiency threshold that varies based on a mid-bed temperature of the SCR catalyst. In a further refinement, the method includes terminating the duty cycle when an exhaust flow rate of the engine exhaust gas is less than a predetermined exhaust flow rate threshold. In one embodiment, the predetermined quantity of reductant is limited by an impingement limit of reductant on the SCR catalyst. The impingement limit is a function of the engine exhaust gas upstream of the SCR catalyst, an outlet temperature of a diesel particulate filter, and an ambient temperature.

In another aspect, an apparatus includes an electronic controller connected to an engine exhaust output NOx sensor, a selective catalytic reduction (SCR) outlet NOx sensor, a diesel particulate filter outlet temperature sensor, a reductant doser control valve and a mid-bed SCR catalyst temperature sensor each associated with an exhaust system of an internal combustion engine. The electronic controller includes a low temperature dosing enablement module, a low temperature dosing on-off module, a low temperature dosing command module, and a low temperature dosing impingement limit module.

In one embodiment, the low temperature dosing enablement module is configured to determine that a low temperature dosing cycle of operation of the doser control valve is enabled in response to a plurality of operating conditions of the exhaust system. In a further embodiment, the low temperature dosing on-off module is configured to determine a dosing on-time for a plurality of pulses of reductant through the doser control valve and a dosing off-time between successive pulses over a low temperature dosing duty cycle. The dosing on-time and the dosing off-time are determined as a function of a temperature signal from the mid-bed SCR catalyst temperature sensor during the low temperature dosing cycle.

In one embodiment, the low temperature dosing command module is configured to determine a low temperature dosing command to supply a quantity of reductant over the dosing cycle that satisfies a maximum ammonia to NOx ratio that is based on the mid-bed SCR catalyst temperature during the low temperature dosing cycle. In a further embodiment, the low temperature dosing impingement limit module is configured to determine a low temperature dosing impingement limit command to limit a final low temperature dosing command. The final low temperature dosing command is determined as a function of an outlet temperature of a diesel particulate filter, an exhaust flow rate, and an ambient temperature.

In one embodiment a reductant dosing enablement module is further configured to determine a reductant dosing enable command to the low temperature dosing on-off module. The reductant dosing enable command is determined as a function of an exhaust flow rate, an SCR catalyst mid-bed temperature, a low temperature dosing efficiency target, and an SCR catalyst efficiency. The SCR efficiency is determined as a function of a low temperature dosing SCR catalyst efficiency target lookup table and the SCR catalyst mid-bed temperature.

According to another aspect, a system includes an internal combustion engine having an exhaust system for receiving an exhaust gas produced from operation of the internal combustion engine and a diesel exhaust aftertreatment system that includes a source of a reductant for treatment of the exhaust gas produced by operation of the internal combustion engine. The diesel exhaust aftertreatment system further includes a doser operable to pump the reductant from the storage tank along a flow path through a control valve to an injector in fluid communication with the exhaust system. The diesel exhaust aftertreatment system further include a selective catalytic reduction (SCR) catalyst that has an SCR catalyst temperature sensor. The system also includes a controller connected to the reductant control valve that is operable to adjust the reductant control valve to control the flow rate of the reductant in the flow path. The controller is configured to variably adjust the reductant flow rate.

In one embodiment, the system is configured to control the control valve to perform any of the methods described herein for low temperature dosing. In one refinement, the SCR catalyst mid-bed temperature is determined by the SCR catalyst temperature sensor in an SCR mid-bed location between an upstream SCR catalyst bed and a downstream SCR catalyst bed. In a further refinement, the controller is configured to determine whether the SCR catalyst mid-bed temperature is in a low temperature range of operation. In one embodiment, the low temperature range of operation corresponds to a mid-bed temperature of the SCR catalyst that is between 150° C. and 190° C.

In other embodiments, the exhaust aftertreatment system may further comprise a storage tank for housing the reductant, a doser operable to pump reductant from the storage tank, a valve for regulating the quantity of reductant emitted from the doser, an injector for injecting reductant through the valve from the doser into an exhaust system of an internal combustion engine, and a selective catalytic reduction catalyst downstream of the injector.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining a mid-bed temperature of a bed of a selective catalytic reduction (SCR) catalyst in an exhaust aftertreatment system is in a low temperature operating range;
   determining whether a reductant dosing rate is greater than a threshold low temperature dosing rate;
   if the reductant dosing rate is greater than the threshold low temperature dosing rate and while in the low temperature operating range, initiating a low temperature dosing cycle to supply a quantity of a reductant to the exhaust aftertreatment system through a series of pulsed injections of reductant, wherein a length of the pulses is modulated dynamically in the dosing cycle as a function of the mid-bed temperature of the bed of the SCR catalyst; and
   terminating the low temperature dosing cycle when an exhaust flow rate of an exhaust gas is below a predetermined exhaust flow rate threshold.

2. The method of claim 1, wherein the exhaust aftertreatment system comprises a storage tank for housing the reductant, a doser operable to pump reductant from the storage tank, a valve for regulating the quantity of reductant emitted from the doser, an injector for injecting reductant through the valve from the doser into an exhaust system of an internal combustion engine, and a selective catalytic reduction catalyst downstream of the injector.

3. The method of claim 1, wherein the low temperature operating range of the SCR catalyst mid-bed is between 150° C and 190° C.

4. The method of claim 1, further comprising terminating the low temperature dosing cycle when an efficiency of the SCR catalyst is above a predetermined SCR catalyst efficiency threshold.

5. The method of claim 4, wherein the predetermined SCR catalyst efficiency threshold varies dynamically in the low temperature dosing cycle based on the SCR catalyst mid-bed temperature.

6. The method of claim 1, wherein the reductant is an aqueous urea solution.

7. The method of claim 1, wherein the exhaust aftertreatment system further comprises a diesel particulate filter (DPF), wherein the quantity of the reductant is limited by an impingement limit of the SCR catalyst, wherein the impingement limit is determined as a function of an outlet temperature of the DPF, an exhaust flow rate, and an ambient temperature.

8. A method, comprising:
  determining a mid-bed temperature of a bed of a selective catalytic reduction (SCR) catalyst in an exhaust aftertreatment system is in a low temperature operating range;
  while in the low temperature operating range, initiating a low temperature dosing cycle to supply a quantity of a reductant to the exhaust aftertreatment system through a series of pulsed injections of reductant, wherein a length of the pulses is modulated dynamically in the dosing cycle as a function of the mid-bed temperature of the bed of the SCR catalyst;
  determining a set of enable conditions are satisfied before initiating the low temperature dosing cycle, wherein the set of enable conditions include: an outlet temperature of a diesel particulate filter (DPF) of the exhaust aftertreatment system being above a DPF temperature threshold; an ambient temperature being above an ambient temperature threshold; an ambient pressure being above an ambient pressure threshold; a urea deposit timer being below a urea deposit timer threshold; an accumulated low temperature dosing amount is below an accumulated reductant threshold; and an ammonia storage timer is below an ammonia storage timer threshold; and
  terminating the low temperature dosing cycle when an exhaust flow rate of an exhaust gas is below a predetermined exhaust flow rate threshold.

9. A method, comprising:
  determining whether a reductant dosing rate is greater than a threshold low temperature dosing rate;
  dosing a reductant into an engine exhaust gas upstream of a selective catalytic reduction (SCR) catalyst while the SCR catalyst is in a low temperature range of operation, wherein dosing the reductant includes injecting a predetermined quantity of the reductant over a duty cycle through a series of pulses each having an on-time with an off-time between successive pulses, wherein the duty cycle is initiated if the reductant dosing rate is greater than the threshold low temperature dosing rate, wherein the on-time and the off-time is a function of a mid-bed temperature of the SCR catalyst during the low temperature range of operation; and
  terminating the duty cycle when an exhaust flow rate of the engine exhaust gas is below a predetermined exhaust flow rate threshold.

10. The method of claim 9, wherein the predetermined quantity of reductant is selected to satisfy an ammonia to nitrous oxide ratio at an outlet of the SCR catalyst, wherein the ammonia to nitrous oxide ratio is a function of the mid-bed temperature of the SCR catalyst.

11. The method of claim 9, wherein the low temperature range of operation corresponds to a mid-bed temperature of the SCR catalyst that is between 150° C and 190° C.

12. The method of claim 9, further comprising terminating the duty cycle when an efficiency of the SCR catalyst exceeds a dynamic SCR catalyst efficiency threshold that varies based on the mid-bed temperature of the SCR catalyst.

13. The method of claim 9, wherein the predetermined quantity of reductant is limited by an impingement limit of reductant on the SCR catalyst, wherein the impingement limit is a function of a flow rate of the engine exhaust gas upstream of the SCR catalyst, an outlet temperature of a diesel particulate filter, and an ambient temperature.

14. An apparatus, comprising:
  an electronic controller connected to an engine exhaust output NOx sensor, selective catalytic reduction (SCR) outlet NOx sensor, a diesel particulate filter outlet temperature sensor, a reductant doser control valve, an exhaust flow sensor and a mid-bed SCR catalyst temperature sensor each associated with an exhaust system of an internal combustion engine, wherein the electronic controller includes:
    a low temperature dosing enablement module configured to determine whether a reductant dosing rate is greater than a threshold low temperature dosing rate and, if the low temperature dosing rate is greater than the threshold low temperature dosing rate, initiate a low temperature dosing cycle, and to determine that the low temperature dosing cycle of operation of the doser control valve is enabled in response to a plurality of operating conditions of the exhaust system;
    a low temperature dosing on-off module configured to determine a dosing on-time for a plurality of pulses of reductant through the doser control valve and a dosing off-time between successive pulses over the low temperature dosing duty cycle, wherein the dosing on-time and the dosing off-time are determined as a function of a temperature signal from the mid-bed SCR catalyst temperature sensor during the low temperature dosing cycle, and wherein the dosing is terminated if an exhaust flow rate from the exhaust flow sensor is below an exhaust flow rate threshold;
    a low temperature dosing command module configured to determine a low temperature dosing command to supply a quantity of reductant over the dosing cycle that satisfies a maximum ammonia to NOx ratio that is based on the mid-bed SCR catalyst temperature during the low temperature dosing cycle; and
    a low temperature dosing impingement limit module configured to determine a low temperature dosing impingement limit command to limit a final low temperature dosing command, wherein the final low temperature dosing command is determined as a function of the low temperature dosing command, an outlet temperature of a diesel particulate filter, an exhaust flow rate, and an ambient temperature.

15. An apparatus, comprising:
  an electronic controller connected to an engine exhaust output NOx sensor, selective catalytic reduction (SCR) outlet NOx sensor, a diesel particulate filter outlet temperature sensor, a reductant doser control valve, an exhaust flow sensor and a mid-bed SCR catalyst temperature sensor each associated with an exhaust system of an internal combustion engine, wherein the electronic controller includes:
    a low temperature dosing enablement module configured to determine that a low temperature dosing cycle of operation of the doser control valve is enabled in response to a plurality of operating conditions of the exhaust system;
    a low temperature dosing on-off module configured to determine a dosing on-time for a plurality of pulses of reductant through the doser control valve and a dosing off-time between successive pulses over the low temperature dosing duty cycle, wherein the dosing on-time and the dosing off-time are determined as a function of a temperature signal from the mid-bed SCR catalyst temperature sensor during the low temperature dosing cycle, and wherein the dosing is terminated if an exhaust flow rate from the exhaust flow sensor is below an exhaust flow rate threshold;
    a low temperature dosing command module configured to determine a low temperature dosing command to supply a quantity of reductant over the dosing cycle that satisfies a maximum ammonia to NOx ratio that is based on the mid-bed SCR catalyst temperature during the low temperature dosing cycle; and a low temperature dosing impingement limit module configured to determine a low temperature dosing impingement limit command to limit a final low temperature dosing command, wherein the final low temperature dosing command is determined as a function of the low temperature dosing command, an outlet temperature of a diesel particulate filter, an exhaust flow rate, and an ambient temperature; and a reductant dosing enablement module configured to determine a reductant dosing enable command to the low temperature dosing on-off module, wherein the reductant dosing enable command is determined as a function of an exhaust flow rate, an SCR catalyst mid-bed temperature, a low temperature dosing SCR catalyst efficiency target, and an SCR catalyst efficiency, wherein the SCR efficiency target is determined as a function of a low temperature dosing SCR catalyst efficiency target lookup table and the SCR catalyst mid-bed temperature.

16. A system, comprising:
an internal combustion engine having an exhaust system for receiving an exhaust gas produced from operation of the internal combustion engine;
a diesel exhaust aftertreatment system that includes a source of a reductant for treatment of the exhaust gas produced by operation of the internal combustion engine, the diesel exhaust aftertreatment system further including a doser operable to pump the reductant along a flow path to an injector in fluid communication with the exhaust system, wherein the diesel exhaust aftertreatment system further includes an exhaust flow sensor to determine an exhaust flow rate, wherein the diesel exhaust aftertreatment system further includes a reductant control valve in the flow path to control a flow of the reductant to the injector, the diesel exhaust aftertreatment system further comprising a selective catalytic reduction (SCR) catalyst, wherein the SCR catalyst further comprises an SCR catalyst temperature sensor;
a controller connected to the reductant control valve that is operable to variably adjust a reductant flow rate through the control valve;
wherein an SCR catalyst mid-bed temperature is deteimined by the SCR catalyst temperature sensor between an upstream SCR catalyst bed and a downstream SCR catalyst bed;
wherein the controller is configured to determine whether a reductant dosing rate is greater than a threshold low temperature dosing rate, and whether the SCR catalyst mid-bed temperature is in a low temperature range of operation and control the control valve in the low temperature range of operation to inject a predetermined quantity of the reductant through the injector over a duty cycle that includes a series of pulses each having an on-time with an off-time between successive pulses, wherein the duty cycle is initiated if the reductant dosing rate is greater than the threshold low temperature dosing rate, and wherein the on-time and the off-time is a function of the SCR catalyst mid-bed temperature during the low temperature range of operation; and
wherein the controller is further configured to terminate the duty cycle if the exhaust flow rate is below an exhaust flow rate threshold.

17. The system of claim 16, wherein the low temperature range of operation corresponds to the SCR catalyst mid-bed temperature being between 150° C. and 190° C.

18. The system of claim 16, wherein the controller is configured to limit the predetermined quantity of reductant by an impingement limit of reductant on the SCR catalyst, wherein the impingement limit is a function of a flow rate of the engine exhaust gas upstream of the SCR catalyst, an outlet temperature of a diesel particulate filter of the diesel exhaust aftertreatment system, and an ambient temperature.

19. A method comprising:
determining a mid-bed temperature of a bed of a selective catalytic reduction (SCR) catalyst in an exhaust aftertreatment system is in a low temperature operating range;
determining a reductant dosing rate is greater than a threshold low temperature dosing rate;
while in the low temperature operating range, initiating a low temperature dosing cycle to supply a quantity of a reductant to the exhaust aftertreatment system through a series of pulsed injections of reductant, wherein a length of the pulses is modulated dynamically in the dosing cycle as a function of the mid-bed temperature of the bed of the SCR catalyst; and
terminating the low temperature dosing cycle when an exhaust flow rate of an exhaust gas is below a predetermined exhaust flow rate threshold,
wherein the low temperature dosing cycle is initiated only when the reductant dosing rate is greater than the threshold low temperature dosing rate.

20. A method, comprising:
determining a mid-bed temperature of a bed of a selective catalytic reduction (SCR) catalyst in an exhaust aftertreatment system is in a low temperature operating range;
while in the low temperature operating range, initiating a low temperature dosing cycle to supply a quantity of a reductant to the exhaust aftertreatment system through a series of pulsed injections of reductant, wherein a length of the pulses is modulated dynamically in the dosing cycle as a function of the mid-bed temperature of the bed of the SCR catalyst;
determining a set of enable conditions are satisfied before initiating the low temperature dosing cycle, wherein the set of enable conditions include:
an outlet temperature of a diesel particulate filter (DPF) of the exhaust aftertreatment system being above a DPF temperature threshold;
an ambient temperature being above an ambient temperature threshold;
an ambient pressure being above an ambient pressure threshold;
a urea deposit timer being below a urea deposit timer threshold;
an accumulated low temperature dosing amount is below an accumulated reductant threshold; and
an ammonia storage timer is below an ammonia storage timer threshold.

21. An apparatus, comprising:
an electronic controller connected to an engine exhaust output NOx sensor, selective catalytic reduction (SCR) outlet NOx sensor, a diesel particulate filter outlet temperature sensor, a reductant doser control valve and a mid-bed SCR catalyst temperature sensor each associated with an exhaust system of an internal combustion engine, wherein the electronic controller includes:

a low temperature dosing enablement module configured to determine that a low temperature dosing cycle of operation of the doser control valve is enabled in response to a plurality of operating conditions of the exhaust system;

a low temperature dosing on-off module configured to determine a dosing on-time for a plurality of pulses of reductant through the doser control valve and a dosing off-time between successive pulses over the low temperature dosing duty cycle, wherein the dosing on-time and the dosing off-time are determined as a function of a temperature signal from the mid-bed SCR catalyst temperature sensor during the low temperature dosing cycle;

a low temperature dosing command module configured to determine a low temperature dosing command to supply a quantity of reductant over the dosing cycle that satisfies a maximum ammonia to NOx ratio that is based on the mid-bed SCR catalyst temperature during the low temperature dosing cycle;

a low temperature dosing impingement limit module configured to determine a low temperature dosing impingement limit command to limit a final low temperature dosing command, wherein the final low temperature dosing command is determined as a function of the low temperature dosing command, an outlet temperature of a diesel particulate filter, an exhaust flow rate, and an ambient temperature; and a reductant dosing enablement module configured to determine a reductant dosing enable command to the low temperature dosing on-off module, wherein the reductant dosing enable command is determined as a function of an exhaust flow rate, an SCR catalyst mid-bed temperature, a low temperature dosing SCR catalyst efficiency target, and an SCR catalyst efficiency, and wherein the SCR catalyst efficiency target is determined as a function of a low temperature dosing SCR catalyst efficiency target lookup table and the SCR catalyst mid-bed temperature.

* * * * *